(12) United States Patent  
Wappler et al.

(10) Patent No.: US 9,361,777 B2  
(45) Date of Patent: Jun. 7, 2016

(54) GATE SYSTEM FOR INVENTORY CONTROL AND THEFT PREVENTION

(71) Applicant: SURGERE, INC., Green, OH (US)

(72) Inventors: William J. Wappler, North Canton, OH (US); David J. Horvat, Moreland Hills, OH (US)

(73) Assignee: Surgere, Inc., Green, OH (US)

( * ) Notice: Subject to any disclaimer, the term of this patent is extended or adjusted under 35 U.S.C. 154(b) by 301 days.

(21) Appl. No.: 14/096,466

(22) Filed: Dec. 4, 2013

(65) Prior Publication Data

US 2015/0154842 A1    Jun. 4, 2015

(51) Int. Cl.

| | | |
|---|---|---|
| G08B 13/14 | (2006.01) | |
| G08B 1/08 | (2006.01) | |
| G08B 13/24 | (2006.01) | |
| G06Q 10/08 | (2012.01) | |

(52) U.S. Cl.  
CPC .......... G08B 13/2462 (2013.01); G06Q 10/087 (2013.01)

(58) Field of Classification Search  
CPC .................... G08B 13/2462; G06Q 10/087  
See application file for complete search history.

(56) References Cited

U.S. PATENT DOCUMENTS

| 6,148,291 | A | 11/2000 | Radican |
| 7,102,509 | B1 * | 9/2006 | Anders ................ G06Q 10/08 340/5.2 |
| 7,518,511 | B1 | 4/2009 | Panja et al. |
| 2002/0073114 | A1 | 6/2002 | Nicastro et al. |
| 2007/0268138 | A1 * | 11/2007 | Chung ................ G01S 5/0018 340/572.1 |
| 2008/0174432 | A1 | 7/2008 | Ulrich |
| 2009/0024491 | A1 | 1/2009 | Choubey |
| 2011/0010275 | A1 | 1/2011 | Hull |
| 2012/0268253 | A1 | 10/2012 | Tuttle |
| 2013/0162459 | A1 | 6/2013 | Aharony et al. |
| 2013/0257594 | A1 | 10/2013 | Collins |
| 2015/0051941 | A1 | 2/2015 | Bell |

* cited by examiner

*Primary Examiner* — Jennifer Mehmood  
*Assistant Examiner* — John Mortell  
(74) *Attorney, Agent, or Firm* — Sand & Sebolt

(57) ABSTRACT

The present invention relates to a gate system which uses overlapping radiation patterns to deduce when an item is entering a warehouse and when an item is leaving a warehouse, for example, for loading onto a truck. The present invention stores information relating to the direction the item moved and actuates an alarm if the item is moved in an unexpected direction. The radiation patterns of the gates are angled such that one radiation pattern from a first antenna is directed towards the loading dock, while another radiation pattern from a second antenna is directed towards the interior of the building. Overlapping the radiation patterns allows the logic circuitry to account for the item as it moves from one side of the gate system to the other.

19 Claims, 5 Drawing Sheets

| Item identifier | Antenna 1 peak time | Antenna 2 peak time | Loaded into warehouse | Loaded into vehicle | Expected Direction |
|---|---|---|---|---|---|
| 00246 | 11:22:08:12 | 11:22:09:14 | Yes | NULL | into warehouse |
| 00247 | 11:23:10:45 | 11:23:11:47 | Yes | NULL | into warehouse |
| 00248 | NULL | NULL | NULL | NULL | into vehicle |
| 00249 | 11:25:03:12 | 11:25:01:81 | NULL | Yes | into warehouse |

FIG-4

GATE SYSTEM FOR INVENTORY CONTROL AND THEFT PREVENTION

BACKGROUND OF THE INVENTION

1. Technical Field

The present invention relates to a gate system for inventory control and theft prevention. More particularly, the present invention relates to asset tracking via directional gate antennas. Specifically, the present invention relates to using multiple directional gate antennas to measure the relative signal strength of signals emanating from articles of goods at a loading dock or similar to determine which articles are entering a structure and which articles are leaving the structure.

2. Background Information

Asset tracking and inventory management are complex components of most modern businesses. The tracking of inventory levels, orders, sales, and deliveries is critical to understanding the global picture of a company's inventory levels. Companies may use inventory management systems to avoid product overstock and outages. However, one critical underlying component of a robust inventory management system is a precise count and location of the inventory itself. Compounding the asset tracking problem is the problem of employee theft, which by some estimates accounts for over 60% of all inventory losses. Therefore, there is a critical need in the art for a system which not only tracks assets by keeping a precise count and location information for each inventory item, but also prevents theft of these assets.

BRIEF SUMMARY OF THE INVENTION

In one aspect, the invention may provide a method of tracking inventory, the method comprising the steps of: providing a first antenna proximate an opening of a structure; providing a second antenna proximate the opening; emanating a signal from an item; moving the item past the first antenna and measuring a first signal strength of the signal as the item moves past the first antenna; determining a first time when the first signal strength peaks; moving the item past the second antenna and measuring a second signal strength of the signal as the item moves past the second antenna; determining a second time when the second signal strength peaks; and comparing the first time and the second time to determine an actual direction the item moved past the first antenna and second antenna; and providing the actual direction to an inventory tracking system.

In another aspect, the invention may provide a method of tracking inventory, the method comprising the steps of: overlapping a first radiation pattern of a first antenna with a second radiation pattern of a second antenna; determining when an item moves through the first radiation pattern and storing the result as a first time; determining when the item moves through the second radiation pattern and storing the result as a second time; and determining the direction the item is traveling by comparing the first time and the second time.

In another aspect, the invention may provide an apparatus adapted to track an item of inventory, the apparatus comprising: a first antenna having a first radiation pattern, wherein the antenna is configured to sense when the item moves through the first radiation pattern; a second antenna having a second radiation pattern, wherein the antenna is configured to sense when the item moves through the second radiation pattern; a server in communication with the first antenna and the second antenna, wherein the server determines an actual direction the item passes by the first antenna and the second antenna; a database in communication with the server, the database comprising an record containing an expected direction for the item to pass by the first antenna and the second antenna; and an alarm system in communication with the server, wherein the server actuates the alarm system when the server determines the item did not pass by the first antenna and the second antenna in the expected direction.

BRIEF DESCRIPTION OF THE SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is a table showing exemplary data gathered and stored by the present invention;

Similar numbers refer to similar parts throughout the drawings.

DETAILED DESCRIPTION OF THE INVENTION

Figure 1:
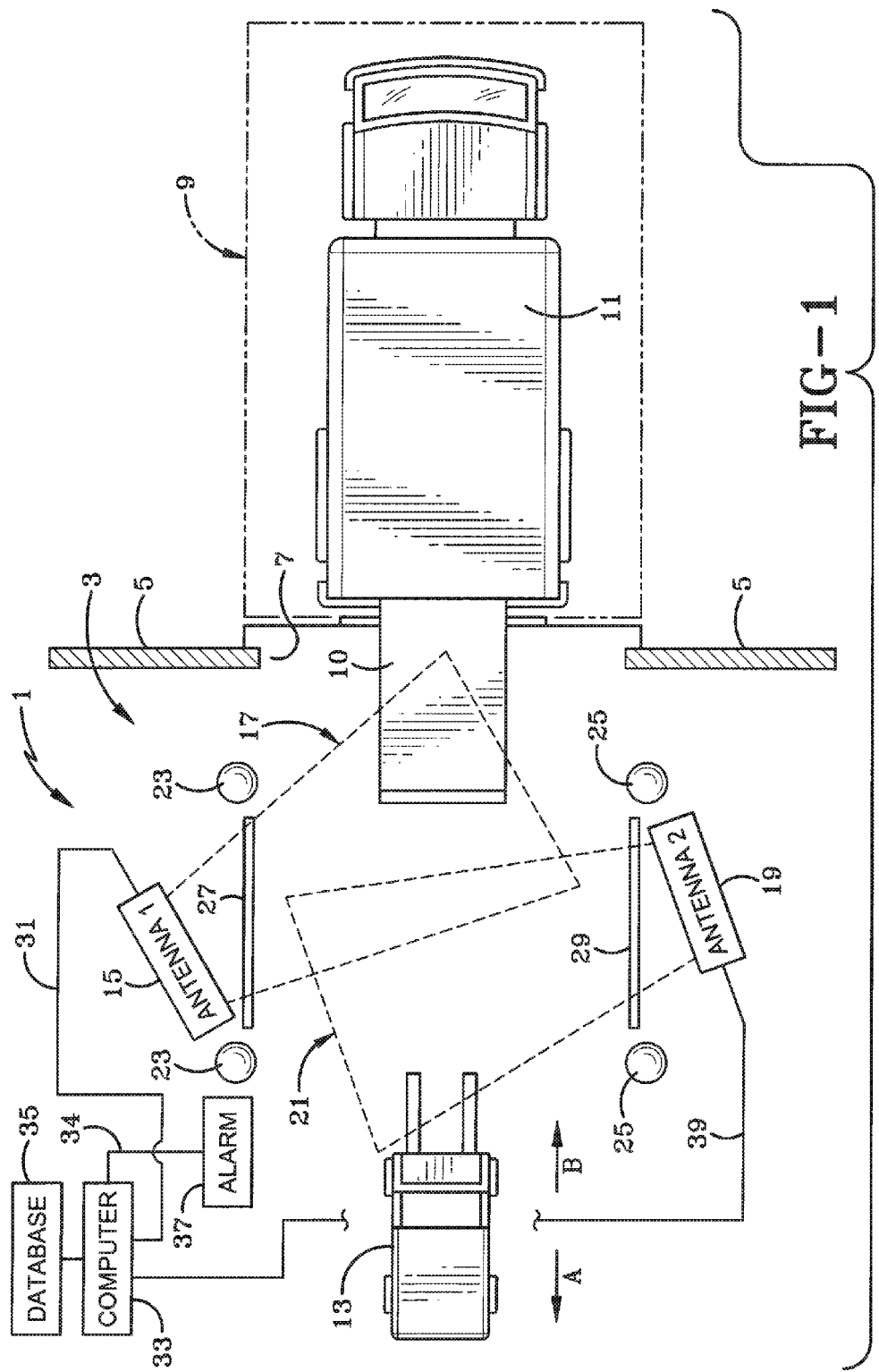
FIG. 1 is a top view of a delivery area of a structure incorporating the present invention.

A gate system is shown in FIGS. 1-5 and referred to generally herein as gate system 1. Various non-novel features found in the prior art relating to gate system 1 are not discussed herein. The reader will readily understand the fundamentals of electromagnetic wave propagation, antenna design, and signal processing are well within the prior art and readily understood by one familiar therewith.

Gate system 1 is adapted to work in conjunction with a building or structure 3 which includes a wall 5 defining an opening 7. Opening 7 is typically embodied in an entranceway into structure 3 at a loading dock area 9, and may be selectively sealable with a door (not shown). As typical in a loading dock, a truck 11 may be positioned proximate opening 7 with a platform 10 extended therefrom and through opening 7 for transferring items between truck 11 and structure 3. A forklift 13 is provided in FIG. 1 for reference and may be used to aid in transferring items between truck 11 and structure 3.

As shown in FIG. 1, a first antenna 15 is disposed within structure 3. First antenna 15 is preferably a directional antenna having a first radiation pattern 17 emanating therefrom in a particular direction. As shown in FIG. 1, first antenna 15 is angled such that first radiation pattern 17 is angled generally towards opening 7. As commonly understood in the prior art, an item emanating a signal in the proper frequency will be received by first antenna 15 when the item is within first radiation pattern 17. Conversely, inasmuch as first antenna 15 is preferably a directional antenna, the signal will not be received by first antenna 15 when the item is outside of first radiation pattern 17. A second antenna 19 is also disposed within structure 3. Second antenna 19 is preferably a directional antenna having a second radiation pattern 21 emanating therefrom in a particular direction. As shown in FIG. 1, second antenna 19 is angled such that second radiation pattern 21 is angled generally away from opening 7. Similar to first antenna 15, any properly formatted signal emanating from an item within second radiation pattern 21 will be received by second antenna 19, as second antenna is preferably a directional antenna. Also similar to first antenna 15, second antenna 19 will not receive signals emanating from outside second radiation pattern 21.

First antenna 15 is positioned behind a first set of bumpers 23 while second antenna 19 is positioned behind a second set of bumpers 25. First set of bumpers 23 provide protection for first antenna 15 while second set of bumpers 25 provide protection for second antenna 19 and both sets of bumpers 23 and 25 are made from a sturdy material, such as steel or reinforced aluminum. Bumpers 23 and 25 are provided to protect antennas 15 and 19, respectively, as warehouses and stockroom areas are often chaotic with forklifts 13 and various other equipment such as dollies constantly moving thereabout. First antenna 15 is further positioned behind first shield 27 while second antenna 19 is further positioned behind second shield 29. While first set of bumpers 23 and second set of bumpers 25 are preferably metallic, first shield 27 and second shield 29 are preferably made from plastic or another similar material which efficiently facilitates the passing through of electromagnetic signals. First shield 27 and second shield 29 are formed from non-metallic material to allow first antenna 15 and second antenna 19 to send and receive signals therethrough.

As shown in FIG. 1, first antenna 15 is connected to a computer 33 by way of a first connection 31. First connection 31 may be a wired or wireless connection for providing a communications mechanism between a first antenna 15 and computer 33. Computer 33 may be any style of computing device, and may include a processor (not shown) coupled with a memory (not shown). Computer 33 is connected to a database 35 for storing information relevant to gate system 1. Computer 33 is also connected to an alarm 37 by way of an alarm connection 34. Alarm connection 34 may be a wired or wireless communication mechanism and provides for data communication between computer 33 and alarm 37. Alarm 37 may be any style of alarming type of system which includes an audible alarm, a silent alarm, or any other type of alert system, including alerting a particular personnel of building 3. Similar to first antenna 15, second antenna 19 is connected to computer 33 by way of a second connection 39. Second connection 39 may be a wired or wireless connection and provides a mechanism for transferring data between computer 33 and second antenna 19. First antenna 15 and second antenna 19 provide information and data relating to signals received thereby and transfers this data to computer 33 by way of first connection 31 and second connection 39, respectively.

Figure 2:
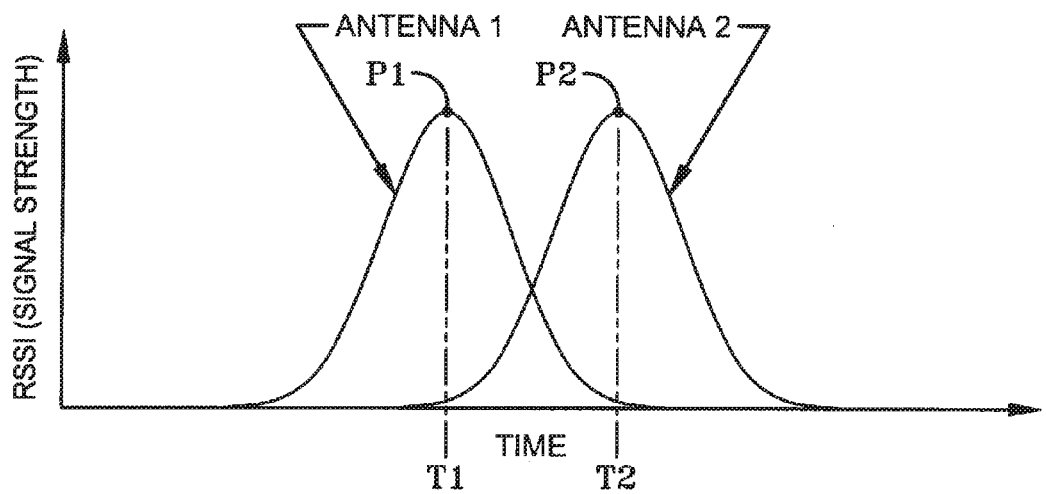
FIG. 2 is a graph representing received signal strengths during an amount of time in the present invention.

As seen in FIG. 2, a graph is provided depicting signal strength in the Y axis and relative to a time duration in the X axis. As an item emanating a signal passes between first antenna 15 and second antenna 19, first antenna 15 and second antenna 19 receive the signal along with its varying signal strength as it passes through first radiation pattern 17 and second radiation pattern 21, respectively. This information is transferred to computer 33 by way of first connection 31 and second connection 39. Computer 33 processes this signal strength information which is represented graphically in FIG. 2. As shown in FIG. 2, the signal strength of the signal passing through first radiation pattern 17 of first antenna 15 gradually swells until peak P1 at time T1, then tapers off as time continues. This represents the item passing through first radiation pattern 17. As the item passes through first radiation pattern 17, the signal strength of the signal emanating therefrom grows as the item approaches its nearest point to first antenna 15. After the item passes this nearest point at time T1, the item moves away therefrom and the respective signal strength of the signal dissipates accordingly. The same scenario happens as the item passes second antenna 19. As shown in FIG. 2, the relative signal strength of the signal emanating from the item grows and swells to peak P2 at time T2 which reflects second antenna 19 positioned differently than first antenna 15. Computer 33 recognizes time T1 occurs before time T2 and thus deduces the item is moving past first antenna 15 first and past second antenna 19 second. It follows that item must be moving from the exterior of building 3 into the interior of building 3 in the direction of Arrow A (FIG. 1).

Figure 3:
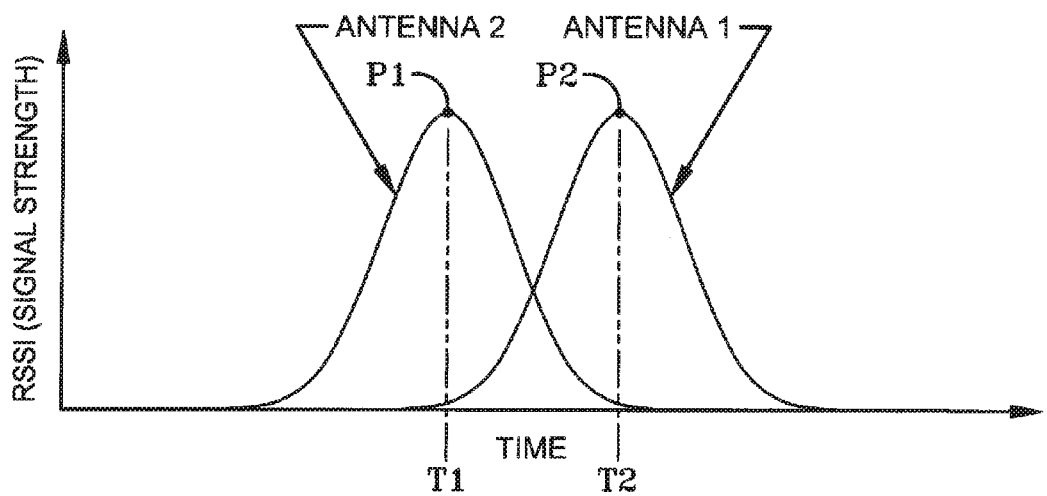
FIG. 3 is a graph representing received signal strengths during an amount of time in the present invention.

As shown in FIG. 3, second antenna 19 receives a peak signal P1 at time T1 while first antenna 15 receives a peak signal P2 at a time T2, which is later than time T1. This allows computer 33 to deduce that the item is traveling from the interior of building 3 towards loading dock area 9, in the direction of Arrow B (FIG. 1). As shown in FIGS. 2 and 3, computer 33 compares data from first antenna 15 and second antenna 19 and ensures there is an overlap of signal readings which is shown generally between T1 and T2. This signifies the item travelled through both radiation pattern areas, including first radiation pattern 17 and second radiation pattern 21. System logic may be implemented to ignore any incoming signals from only one antenna if computer 33 does not receive an overlapping signal as shown in FIGS. 2 and 3. These false positives may be triggered by merchandise being moved within truck 11 to make room for forklift 13 or any other reason merchandise may need to be moved yet not pass all the way through both radiation patterns. As shown in FIG. 4, a database table 41 is provided as an exemplary embodiment of data storage within database 35. Database table 41 stores data provided to computer 33 by first antenna 15 and second antenna 19. Database table 41 generally includes information relating to antenna signals generated by a particular item and the direction this item traveled through gate system 1. As such, a key column 43 is provided to represent unique identifiers correlated to an item needing to be tracked. A column 45 is provided for storing information relating to each item and the first antenna 15 peak time with respect to that item. Column 45 represents the time in which first antenna 15 receives the strongest signal from the associated item found in column 43. For example, with respect to FIG. 2, column 45 would store time T1 therein. Database table 41 also includes a column 47, which stores information relating to second antenna 19 peak time with respect to each item. For example, as shown in FIG. 2, column 47 would store time T2 therein. When a database row is created for a new item, a column 49 is set to null or no value therein. Similarly, when a new item is created in database 41, a column 51 is created and also set to null or no data. Column 49 represents whether computer 33 determines the respective item was loaded into the warehouse. Similarly, column 51 represents the determination made by computer 33 as to whether the particular item found in column 43 was loaded into the vehicle. Database table 41 also includes an expected direction column 52. Column 52 indicates whether the row item is expected to be received into the warehouse or received into the truck. The data in this column may be maintained by the manufacturer or a global inventory management system or any other mechanism which may supply the data indicating where the item in that particular row should be received.

By way of example, populating a row of database table 41 is now described with respect to row A. Cell 43A of database table 41 is populated with an identification key representing an item intended for use with gate system 1. Specifically, cell 43A includes the entry '00246' which represents an item in database table 41. Cell 45A includes a time stamp of '11:22:08:12' which represents the precise time first antenna 15 received the strongest signal from the item. Cell 47A includes entry '11:22:09:14' which represents precisely when second antenna 19 received the strongest signal emanating from the item. One will recognize that the time stamp within cell 47A is about one second later than the time stamp in cell 45A. Thus, inasmuch as the timestamp for second antenna 19 is later than the timestamp for first antenna 15, computer 33 may deduce that item '00246' travelled in the direction of Arrow A (FIG. 1) and was received into building 3. Thus, computer 33 indicates in cell 49A that item '00246' was affirmatively loaded into building 3, overwriting the default null value which previously resided in cell 49A. Cell 51A remains set to null as computer 33 did not update this cell because item '00246' was not loaded into the vehicle according to the signals received by first antenna 15 and second antenna 19. Thereafter, item '00246' is accounted for and a user interested in any data relating to item '00246' may look at database table 41 and see that item '00246' was loaded into building 3 at approximately 11:22:09:14. One will readily recognize that a date column or more data may be added to database table 41 in conformance with any requirements a user or an implementor of gate system 1 may require.

System logic may be implemented to actuate alarm 37 when an item is indicated as already being either loaded into building 3 or loaded into truck 11 and first antenna 15 and second antenna 19 receive a signal emanating from this item indicating it is again moving. For example, if computer 33 determines item '00246' is being loaded into truck 11 having already been loaded into building 3, as shown in cell 49a, computer 33 may actuate alarm 37, as this would indicate the item is potentially being stolen or at least creating an anomalous situation. As such, database table 41 may also include column 52 relating to an expected direction in which the item is expected to travel within gate system 1. For example, item '00246' is associated with an expected direction of received "into warehouse," and first antenna 15 and second antenna 19 determine item '00246' is not moving in the expected direction, computer 33 may actuate alarm 37. This and other system logic may be implemented to utilize the data available via first antenna 15 and second antenna 19, particularly with respect to the direction the items are traveling within gate system 1.

Figure 5:
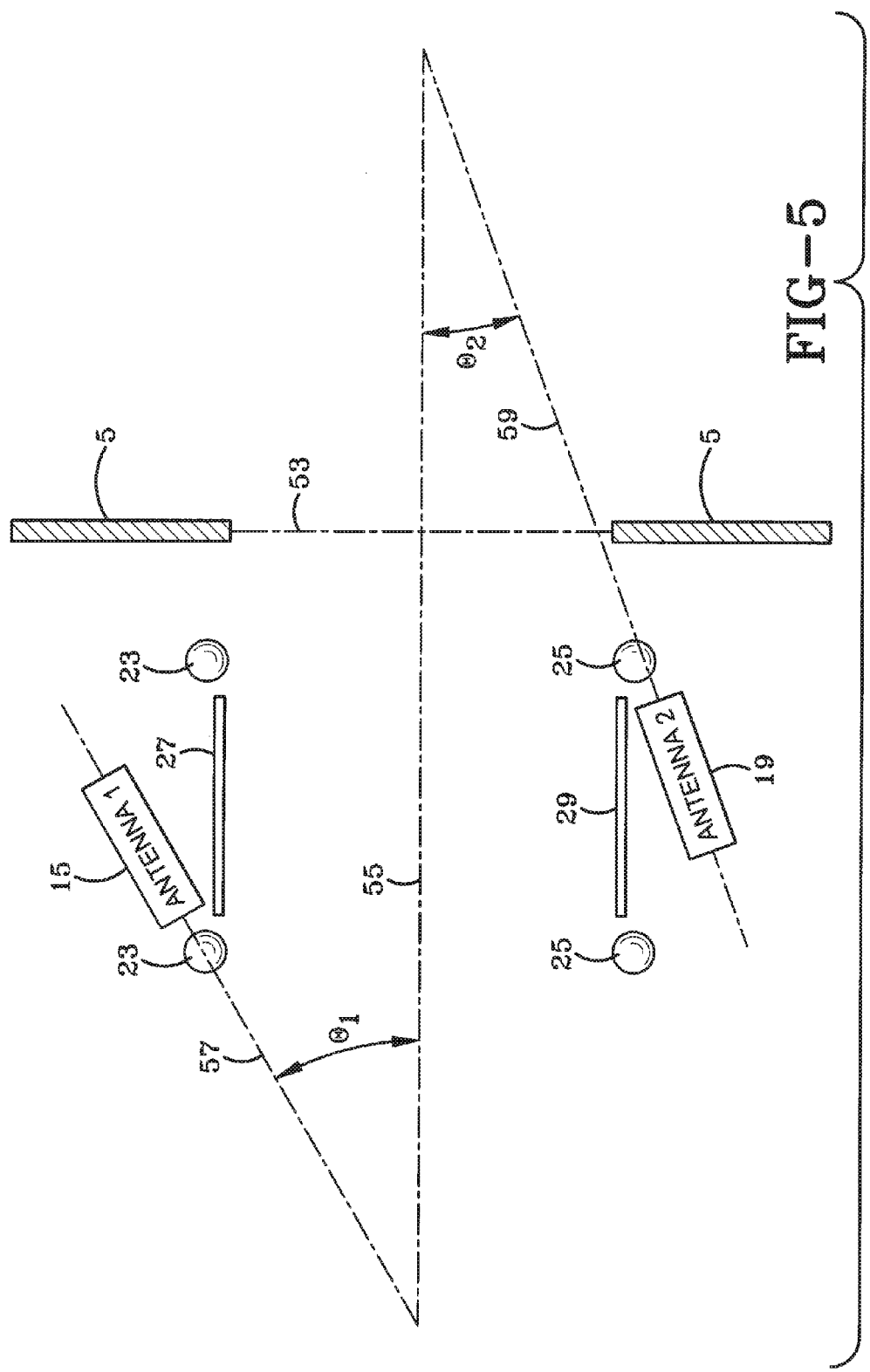
FIG. 5 is a top view similar to FIG. 1, showing relative angles of antennas in the present invention.

As shown in FIG. 5, gate system 1 may include an imaginary line 53 extending parallel with wall 5. Gate system 1 may further include an imaginary line 55 extending perpendicularly to imaginary line 53. As shown in FIG. 5, each antenna in gate system 1 includes an imaginary longitudinal line extending therethrough. More particularly, first antenna 15 includes an imaginary first longitudinal line 57 extending therethrough while second antenna 19 includes an imaginary second longitudinal line 59 extending therethrough. First longitudinal line 57 extends at an angle theta 1 with respect to imaginary line 55. Similarly, second longitudinal line 59 extends at an angle theta 2 with respect to imaginary line 55. In a preferred embodiment of gate system 1, theta 1 is equal to approximately 30°, while theta 2 is equal to approximately 20°. Thus, one readily recognize first antenna 15 is offset from the parallel relationship with second antenna 19 by about 10° in the preferred embodiment. When viewed with respect to FIG. 1, this allows the associated radiation patterns to overlap while still providing sufficient coverage of opening 7 and the internal areas of building 3.

Figure 6:
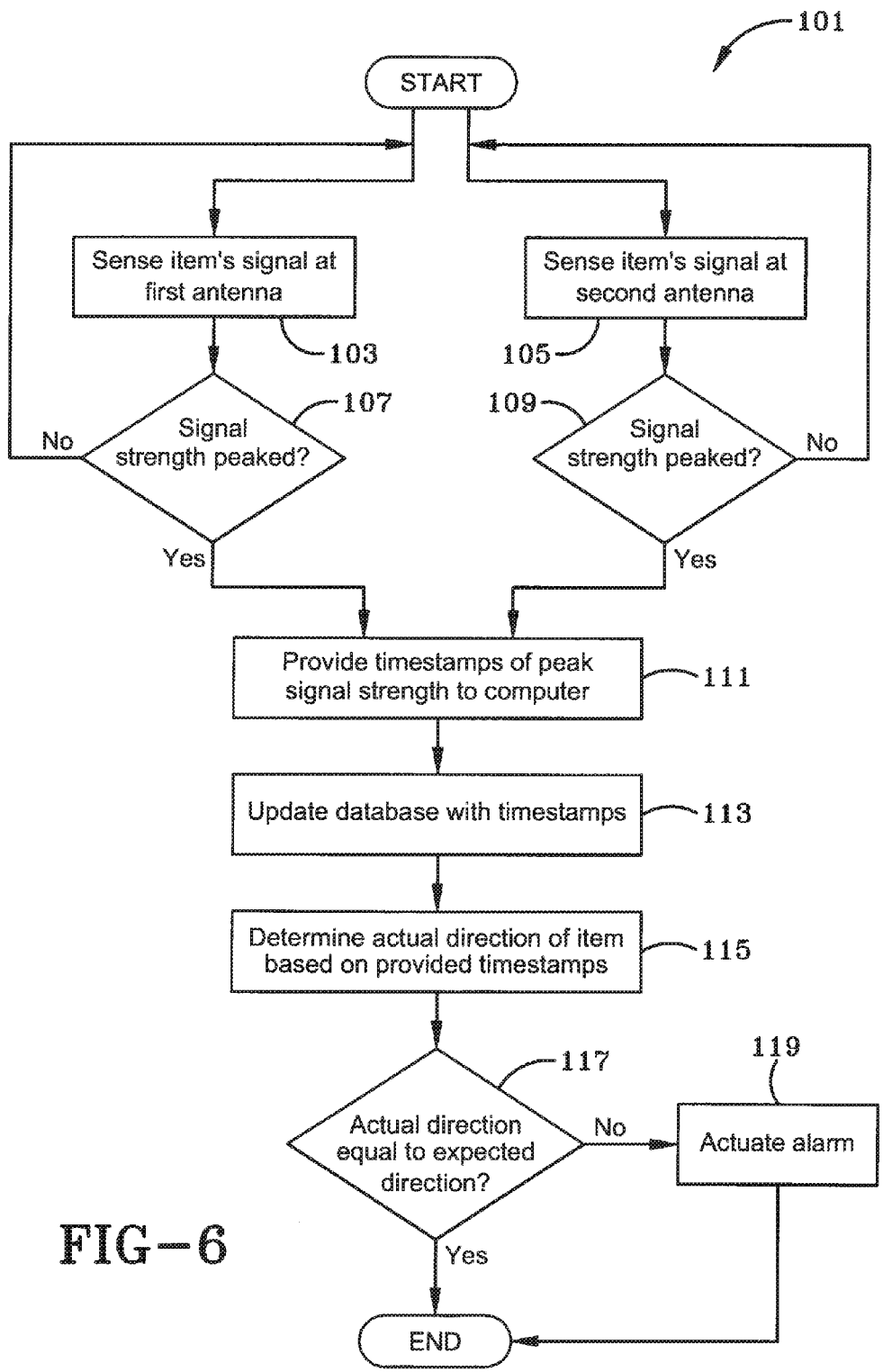
FIG. 6 is a diagram depicting a method of the present invention.

As shown in FIG. 6, gate system 1 includes a method 101. Method 101 begins and simultaneously enters both a step 103 and a step 105. In step 103, the first antenna of the present invention senses an item's signal. Step 103 then moves to a step 107. In step 105, the second antenna of the present invention senses the item's signal. Step 105 then moves to a step 109. In step 107, a determination is made as to whether the sensed signal is at its peak signal strength. If it is, step 107 proceeds to a step 111. If the signal sensed in step 107 is not at its peak signal strength, step 107 proceeds back to step 103 to repeat the sensing process. In step 109, a determination is made as to whether the sensed signal is at its peak signal strength. If it is, step 109 proceeds to step 111. If the signal sensed in step 109 is not at its peak signal strength, step 109 proceeds back to step 105 to repeat the sensing process. Step 111 collects the timestamp collected by the first antenna and provided by step 107 and the timestamp collected by the second antenna and provided by step 109 and provides these two timestamps to the computer. Step 111 thereafter proceeds to a step 113. Step 113 updates the database by entering the two timestamps in the appropriate database table(s) associated with the item and proceeds to a step 115. In step 115, the computer determines the actual direction of the item based on the timestamp acquired from the first antenna and the timestamp acquired from the second antenna and proceeds to a step 117. Step 117 determines whether the actual direction is equal to the expected direction. If the actual direction is equal to the expected direction, step 117 proceeds to end method 101. If step 117 determines that the actual direction is not equal to the expected direction, step 117 proceeds to a step 119. In step 119, the alarm is actuated as the item is traveling in an unexpected direction which may indicate a theft situation or another anomaly. Step 117 thereafter proceeds to end method 101.

"Logic," "logic circuitry," or "logic circuit," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied therefrom beyond the requirement of the prior art because such terms are used for descriptive purposes and are intended to be broadly construed.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

The invention claimed is:

1. A method of tracking inventory, the method comprising the steps of:
    providing a first antenna proximate an opening of a structure;
    defining an imaginary plane parallel to the opening in a wall of the structure;
    defining an imaginary opening line orthogonal to the imaginary plane;
    defining a first imaginary line extending longitudinally through the first antenna;
    orienting the first antenna such that the first imaginary line is between a 25 and 35 degree angle from the imaginary opening line;
    providing a second antenna proximate the opening;
    emanating a signal from an item;
    moving the item past the first antenna and measuring a first signal strength of the signal as the item moves past the first antenna;
    determining a first time when the first signal strength peaks;
    moving the item past the second antenna and measuring a second signal strength of the signal as the item moves past the second antenna;
    determining a second time when the second signal strength peaks; and
    comparing the first time and the second time to determine an actual direction the item moved past the first antenna and second antenna; and
    providing the actual direction to an inventory tracking system.

2. The method of claim 1, further comprising the step of sounding an alarm when one of the first antenna and the second antenna receive the signal from the item after the actual direction is provided to the inventory tracking system.

3. The method of claim 1, wherein the first antenna and the second antenna are directional antennas.

4. The method of claim 3, further comprising the step of overlapping a first radiation pattern of the first antenna with a second radiation pattern of the second antenna.

5. The method of claim 4, further comprising the steps of:
    directing the first radiation pattern towards the opening; and
    directing the second radiation pattern away from the opening.

6. The method of claim 1, further comprising the steps of:
    defining a second imaginary line extending longitudinally through the second antenna;
    orienting the second antenna such that the second imaginary line is between a 15 and 25 degree angle from the imaginary opening line.

7. The method of claim 1, further comprising the step of associating the item with a record in a database of the inventory tracking system.

8. The method of claim 7, further comprising the steps of:
    associating the first time with the record; and
    associating the second time with the record.

9. The method of claim 8, further comprising the steps of:
    associating an expected direction with the record;
    comparing the expected direction with the actual direction; and
    sounding an alarm when the expected direction is different from the actual direction.

10. A method of tracking inventory, the method comprising the steps of:
    defining an imaginary plane parallel to a wall forming an opening;
    defining an imaginary opening line orthogonal to the imaginary plane;
    defining a first imaginary line extending longitudinally through a first antenna;
    orienting the first antenna such that the first imaginary line is between a 25 and 35 degree angle from the imaginary opening line;
    overlapping a first radiation pattern of the first antenna with a second radiation pattern of a second antenna;
    determining when an item moves through the first radiation pattern and storing the result as a first time;
    determining when the item moves through the second radiation pattern and storing the result as a second time; and
    determining the direction the item is traveling by comparing the first time and the second time.

11. The method of claim 10, further comprising the steps of:
    expecting the item to be traveling in an expected direction;
    determining whether the direction the item is traveling is the expected direction; and
    actuating an alarm system if the direction the item is traveling is not the expected direction.

12. The method of claim 11, further comprising the steps of:
    storing a variable representing the expected direction in a database system; and
    determining whether the direction the item is traveling is the expected direction by comparing the direction with the variable in the database.

13. The method of claim 12, further comprising the steps of:
    disposing the first antenna and the second antenna in a building, wherein the building defines a building interior and a building exterior;
    directing the first radiation pattern towards the building interior; and
    directing the second radiation pattern towards the building exterior.

14. The method of claim 13, further comprising the steps of:
    emitting a signal from the item;
    sensing the signal by the first antenna to determine when the item moves through the first radiation pattern; and
    sensing the signal by the second antenna to determine when the item moves through the second radiation pattern.

15. The method of claim 14, further comprising the steps of:
- measuring repeatedly by the first antenna the power present in the signal as the item moves through the first radiation pattern;
- setting the first time equal to when the first antenna determines the power present in the signal is the greatest as the item moves through the first radiation pattern;
- measuring repeatedly by the second antenna the power present in the signal as the item moves through the second radiation pattern; and
- setting the second time equal to when the second antenna determines the power present in the signal is the greatest as the item moves through the second radiation pattern.

16. An apparatus adapted to track an item of inventory, the apparatus comprising:
- a first antenna having a first radiation pattern, wherein the antenna is configured to sense when the item moves through the first radiation pattern;
- a second antenna having a second radiation pattern, wherein the antenna is configured to sense when the item moves through the second radiation pattern;
- an imaginary plane parallel to a wall forming an opening;
- an imaginary opening line orthogonal to the imaginary plane;
- a first imaginary line extending longitudinally through the first antenna;
- wherein the first antenna is oriented such that the first imaginary line is between a 25 and 35 degree angle from the imaginary opening line;
- a server in communication with the first antenna and the second antenna, wherein the server determines an actual direction the item passes by the first antenna and the second antenna;
- a database in communication with the server, the database comprising an record containing an expected direction for the item to pass by the first antenna and the second antenna; and
- an alarm system in communication with the server, wherein the server actuates the alarm system when the server determines the item did not pass by the first antenna and the second antenna in the expected direction.

17. The apparatus of claim 16, further comprising:
- a signal generated by the item;
- a first power sensor module disposed in the first antenna and configured to determine a first time when the power present in the signal is the greatest as the item moves through the first radiation pattern;
- a second power sensor module disposed in the second antenna and configured to determine a second time when the power present in the signal is the greatest as the item moves through the second radiation pattern;
- wherein the first antenna communicates the first time to the server;
- wherein the second antenna communicates the second time to the server; and
- wherein the server compares the first time and the second time to determine the actual direction.

18. The apparatus of claim 17, wherein the first antenna and the second antenna are directional antennas.

19. The apparatus of claim 18, wherein the first radiation pattern overlaps the second radiation pattern.

* * * * *